US007395523B2

(12) United States Patent
Bates et al.

(10) Patent No.: US 7,395,523 B2
(45) Date of Patent: Jul. 1, 2008

(54) METHOD AND APPARATUS FOR EFFICIENTLY DEVELOPING ENCODED INSTRUCTIONS BY TRACKING MULTIPLE UNVERIFIED INSTANCES OF REPETITIVE CODE SEGMENTS

(75) Inventors: Cary Lee Bates, Rochester, MN (US); Paul W. Buenger, Eau Claire, WI (US)

(73) Assignee: International Business Machines Corporation, Armonk, NY (US)

( * ) Notice: Subject to any disclaimer, the term of this patent is extended or adjusted under 35 U.S.C. 154(b) by 515 days.

(21) Appl. No.: 10/720,961

(22) Filed: Nov. 24, 2003

(65) Prior Publication Data

US 2005/0114833 A1 May 26, 2005

(51) Int. Cl.
*G06F 9/44* (2006.01)
(52) U.S. Cl. .................... 717/112; 717/113; 717/140
(58) Field of Classification Search ......... 717/110–113, 717/140
See application file for complete search history.

(56) References Cited

U.S. PATENT DOCUMENTS

| 2003/0142134 A1 | 7/2003 | Bates et al. |
| 2003/0145051 A1 | 7/2003 | Bates et al. |

OTHER PUBLICATIONS

Cederqvist et al., Version Management with CVS for cvs 1.11.2, 1992, 1993, p. 1-167.*
Inforamtion Technology, Rice University, Introduction to the vi Editor, document UNIX 4, Jul. 11, 2002, p. 23.*
Robert C. Miller, Lightweight Structure in Text, School of Computer Science, Carnegie Mellon University, May 2002, [online] [retrieved on Nov. 20, 2006], Retrieved from Internet <http://www.cs.cmu.edu/~rcm/papers/thesis/>, chapters 9, 10, pp. iii-xxii, 221-265.*

* cited by examiner

*Primary Examiner*—Tuan Dam
*Assistant Examiner*—Zheng Wei
(74) *Attorney, Agent, or Firm*—Roy W. Truelson

(57) ABSTRACT

A development environment tracks code sections which have been copied and pasted into a code module from a source code section which has not been subjected to certain verifications. In one aspect, if an error in a copied section is later found during a verification process, the programmer is allowed to perform a multi-edit operation, whereby an edited change to a single copy is automatically propagated to multiple copies. In another aspect, the programmer is warned when copying and pasting a code section which has not been verified. Preferably, verification is performed in the process of compiling source into executable object code.

10 Claims, 7 Drawing Sheets

METHOD AND APPARATUS FOR EFFICIENTLY DEVELOPING ENCODED INSTRUCTIONS BY TRACKING MULTIPLE UNVERIFIED INSTANCES OF REPETITIVE CODE SEGMENTS

FIELD OF THE INVENTION

The present invention relates to digital data processing, and in particular to methods and apparatus for generating computer code by source editing, compiling, building, debugging, and/or similar techniques.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises one or more central processing units (CPU) and supporting hardware necessary to store, retrieve and transfer information, such as communication buses and memory. It also includes hardware necessary to communicate with the outside world, such as input/output controllers or storage controllers, and devices attached thereto such as keyboards, monitors, tape drives, disk drives, communication lines coupled to a network, etc. The CPU or CPUs are the heart of the system. They execute the instructions which comprise a computer program and direct the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Sophisticated software at multiple levels directs a computer to perform massive numbers of these simple operations, enabling the computer to perform complex tasks. What is perceived by the user as a new or improved capability of a computer system is made possible by performing essentially the same set of very simple operations, but using software having enhanced function, along with faster hardware.

In the very early history of the digital computer, computer programs which instructed the computer to perform some task were written in a form directly executable by the computer's processor. Such programs were very difficult for a human to write, understand and maintain, even when performing relatively simple tasks. As the number and complexity of such programs grew, this method became clearly unworkable. As a result, alternate forms of creating and executing computer software were developed.

Among the techniques introduced for creating software have been the use of high-level languages, the combining of multiple program modules, including libraries of programming code, and the use of integrated development environments. High-level languages vary in their characteristics, but all such languages are intended to make it easier for a human to write a program to perform some task. Typically, high-level languages represent instructions, fixed values, variables, and other constructs in a manner readily understandable to the human programmer rather than the computer. Such programs are not directly executable by the computer's processor. In order to run on the computer, the programs must first be transformed into a form that the processor can execute.

Transforming a high-level language program into executable form requires that the human-readable program form (source code) be converted to a processor-executable form (object code) in a compilation process. For very simple programs, the entire program is potentially compilable as a single unit. However, as programs have grown in complexity, and frequently call or invoke functions and procedures which are parts of other programs, it is often impractical to compile the program as a single unit. In a typical case, individual modules or parts of a program are separately compiled, and a further process, sometimes referred to herein as a build process, gathers the different parts and places references in each part to other parts as required, so that the parts may execute together as a single program.

As programs have grown in sophistication, it is known to employ program libraries of commonly used procedures. A program library is not intended to function as a stand-alone program, but is instead a collection of executable procedures or functions which may be used by other programs. Often, a program library has some common theme to the procedures contained therein for supporting applications of a certain family, such as an accounting library, a database library, a graphics library, and so forth. It is usually intended that such libraries be incorporated into many different applications by linking or binding to the application program, although it is not necessarily true that each application program will use all of the procedures in the library. The program library may contain many separately compiled individual modules.

Large software applications are usually developed using sophisticated integrated development environments, which include the capabilities to edit source code, manage program libraries, compile individual modules, build applications from collections of modules, debug executable code, and/or other capabilities. These various functions of an integrated development environment are often embodied as a suite of applications intended to work together, although such an environment may be assembled from separate programs, or might even be a single combined application program having different invokable functions.

Despite the great progress that has been made in the field of software development tools and support, these development systems can barely keep up with the growing complexity of the software being created. Software development remains a very expensive and time consuming process. As the demand for more sophisticated software grows, the costs of software development will only increase. Viewed in the context of the already enormous resources devoted to software development, even minor or marginal improvements to software developers' productivity can have significant aggregate cost benefits. There is, therefore, a continuing need, now and in the future, for improved software development techniques and tools, which will counter the inevitable rising costs of software development.

In many cases, the starting point for an improvement is a realization, not always generally recognized by those of skill in the art, that some commonly performed technique is itself less than optimal, and might be improved. In the case of software development, one such common technique is the copying of a section of code into multiple different locations. Conventional source editors make it relatively simple to copy a code fragment into different locations in a source module, or into different source modules. Such copying is often performed before the code fragment has gone through certain verification processes, such as those inherent in compilation.

If a code module or modules are verified after making multiple copies of the same fragment, and an error is found during verification, it is generally necessary to manually edit each individual fragment copy. This editing is repetitive, since the same mistake is generally propagated to all the copies. In addition to the time required for correcting the same information multiple times, this introduces the possibility that the software developer (referred to herein for simplicity as the programmer) will make a further mistake on one or more of the copies, requiring further correction after a second compilation.

SUMMARY OF THE INVENTION

A development environment tracks code sections which have been copied and pasted into a code module from a source code section which has not been subjected to certain verifications. Tracking such occurrences allows certain corrective action to be taken.

In one aspect of the preferred embodiment, if an error in multiple instances of a copied section is later found during a verification process, the programmer is allowed to perform a multi-edit operation, whereby the programmer specifies a change to a single copy, and the change is automatically propagated to the multiple copies.

In another aspect of the preferred embodiment, the programmer is warned when copying and pasting a code section which has not been verified, so that the programmer does not inadvertently copy a code section before verification. In this case, the programmer may choose to verify the code section before generating multiple copies.

In the preferred embodiment, the verification process is the normal syntax and other verification performed during a compilation process. Syntax errors detectable by a compiler are normally limited to a single statement or small group of statements, and would likely be propagated with the group of statements when copying a section of code. It may alternatively be possible to apply the principles of the present invention to code verifications performed at other stages of code development, such as verification in a testing phase using a battery of test cases, following a build process which combines multiple compiled modules. However, since errors discovered at a later stage of the development process tend to be more subtle in nature, it is not always the case that the same error will be repeated in multiple copies of the same code section.

By identifying unverified copies during the editing process, and identifying multiple copies of the same error for a multi-edit operation, the amount of time a programmer spends correcting repetitive errors which have been propagated through copy/paste operations is reduced, and the code development process made more efficient.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
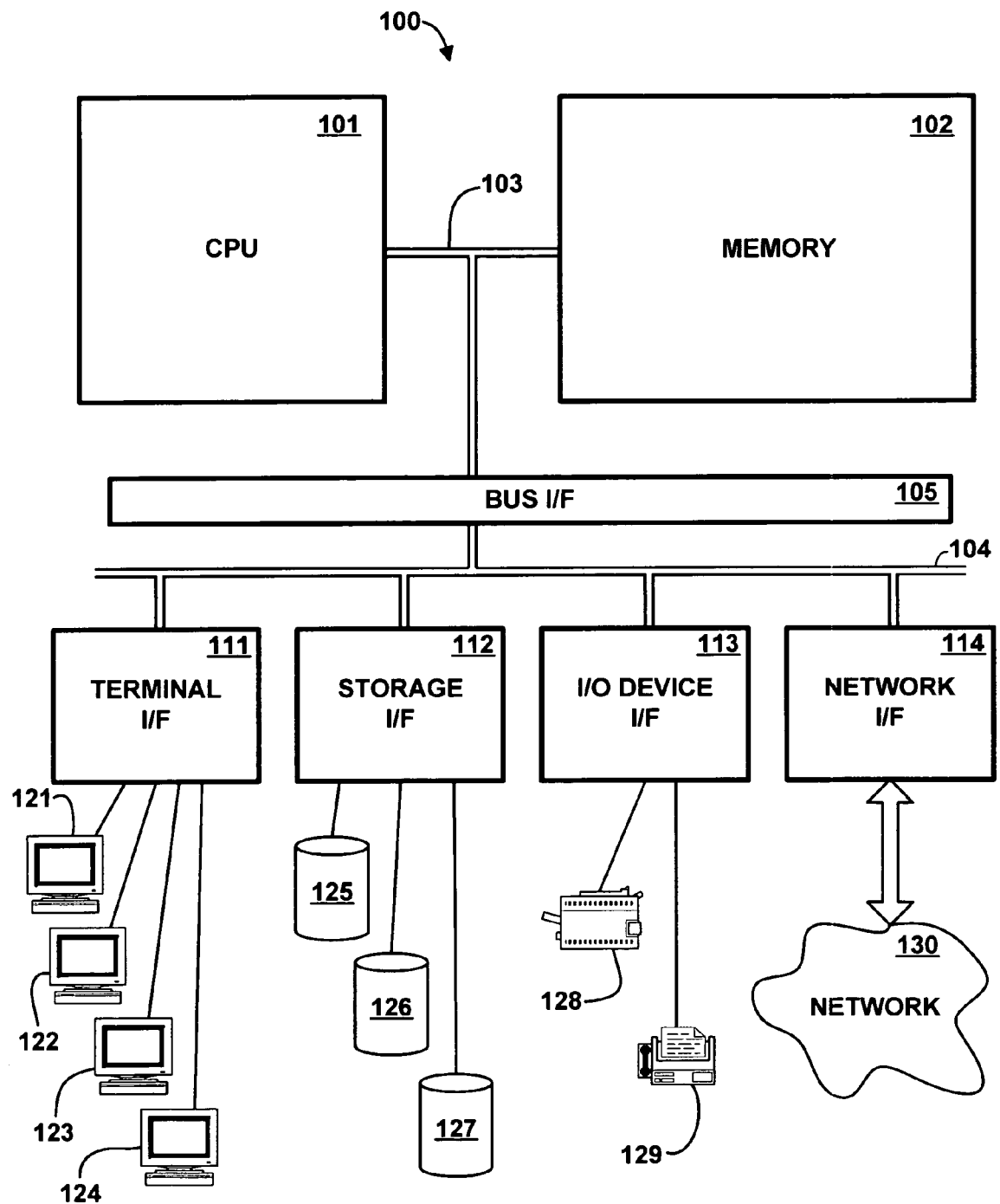
FIG. 1 is a high-level block diagram of the major hardware components of a computer system for developing computer programming code, according to the preferred embodiment of the present invention.

Referring to the Drawing, wherein like numbers denote like parts throughout the several views, FIG. 1 is a high-level representation of the major hardware components of a computer system 100 for developing computer programming code, according to the preferred embodiment of the present invention. CPU 101 is a general-purpose programmable processor which executes instructions and processes data from main memory 102. Main memory 102 is preferably a random access memory using any of various memory technologies, in which data is loaded from storage or otherwise for processing by CPU 101.

Memory bus 103 provides a data communication path for transferring data among CPU 101, main memory 102 and I/O bus interface unit 105. I/O bus interface 105 is further coupled to system I/O bus 104 for transferring data to and from various I/O units. I/O bus interface 105 communicates with multiple I/O interface units 111-114, which may also be known as I/O processors (IOPs) or I/O adapters (IOAs), through system I/O bus 104. System I/O bus may be, e.g., an industry standard PCI bus, or any other appropriate bus technology. The I/O interface units support communication with a variety of storage and I/O devices. For example, terminal interface unit 111 supports the attachment of one or more user terminals 121-124. Storage interface unit 112 supports the attachment of one or more direct access storage devices (DASD) 125-127 (which are typically rotating magnetic disk drive storage devices, although they could alternatively be other devices, including arrays of disk drives configured to appear as a single large storage device to a host). I/O device interface unit 113 supports the attachment of any of various other types of I/O devices, such as printer 128 and fax machine 129, it being understood that other or additional types of I/O devices could be used. Network interface 114 supports a connection to an external network 130 for communication with one or more other digital devices. Network 130 may be any of various local or wide area networks known in the art. For example, network 130 may be an Ethernet local area network, or it may be the Internet. Additionally, network interface 114 might support connection to multiple networks.

It should be understood that FIG. 1 is intended to depict the representative major components of system 100 at a high level, that individual components may have greater complexity that represented in FIG. 1, that components other than or in addition to those shown in FIG. 1 may be present, and that the number, type and configuration of such components may vary, and that a large computer system will typically have more components than represented in FIG. 1. Several particular examples of such additional complexity or additional variations are disclosed herein, it being understood that these are by way of example only and are not necessarily the only such variations.

Although only a single CPU 101 is shown for illustrative purposes in FIG. 1, computer system 100 may contain multiple CPUs, as is known in the art. Although main memory 102 is shown in FIG. 1 as a single monolithic entity, memory 102 may in fact be distributed and/or hierarchical, as is known in the art. E.g., memory may exist in multiple levels of caches, and these caches may be further divided by function, so that one cache holds instructions while another holds non-instruction data which is used by the processor or processors. Memory may further be distributed and associated with different CPUs or sets of CPUs, as is known in any of various so-called non-uniform memory access (NUMA) computer architectures. Although memory bus 103 is shown in FIG. 1 as a relatively simple, single bus structure providing a direct communication path among CPU 101, main memory 102 and I/O bus interface 105, in fact memory bus 103 may comprise multiple different buses or communication paths, which may be arranged in any of various forms, such as point-to-point links in hierarchical, star or web configurations, multiple hierarchical buses, parallel and redundant paths, etc. Furthermore, while I/O bus interface 105 and I/O bus 104 are shown as single respective units, system 100 may in fact contain multiple I/O bus interface units 105 and/or multiple I/O buses 104. While multiple I/O interface units are shown which separate a system I/O bus 104 from various communications paths running to the various I/O devices, it would alternatively be possible to connect some or all of the I/O devices directly to one or more system I/O buses.

Computer system 100 depicted in FIG. 1 has multiple attached terminals 121-124, such as might be typical of a multi-user "mainframe" computer system. Typically, in such a case the actual number of attached devices is greater than those shown in FIG. 1, although the present invention is not limited to systems of any particular size. User workstations or terminals which access computer system 100 might also be attached to and communicated with system 100 over network 130. Computer system 100 may alternatively be a single-user system, typically containing only a single user display and keyboard input.

While various system components have been described and shown at a high level, it should be understood that a typical computer system contains many other components not shown, which are not essential to an understanding of the present invention. In the preferred embodiment, computer system 100 is a computer system based on the IBM AS/400™ or i/Series™ architecture, it being understood that the present invention could be implemented on other computer systems.

Figure 2:
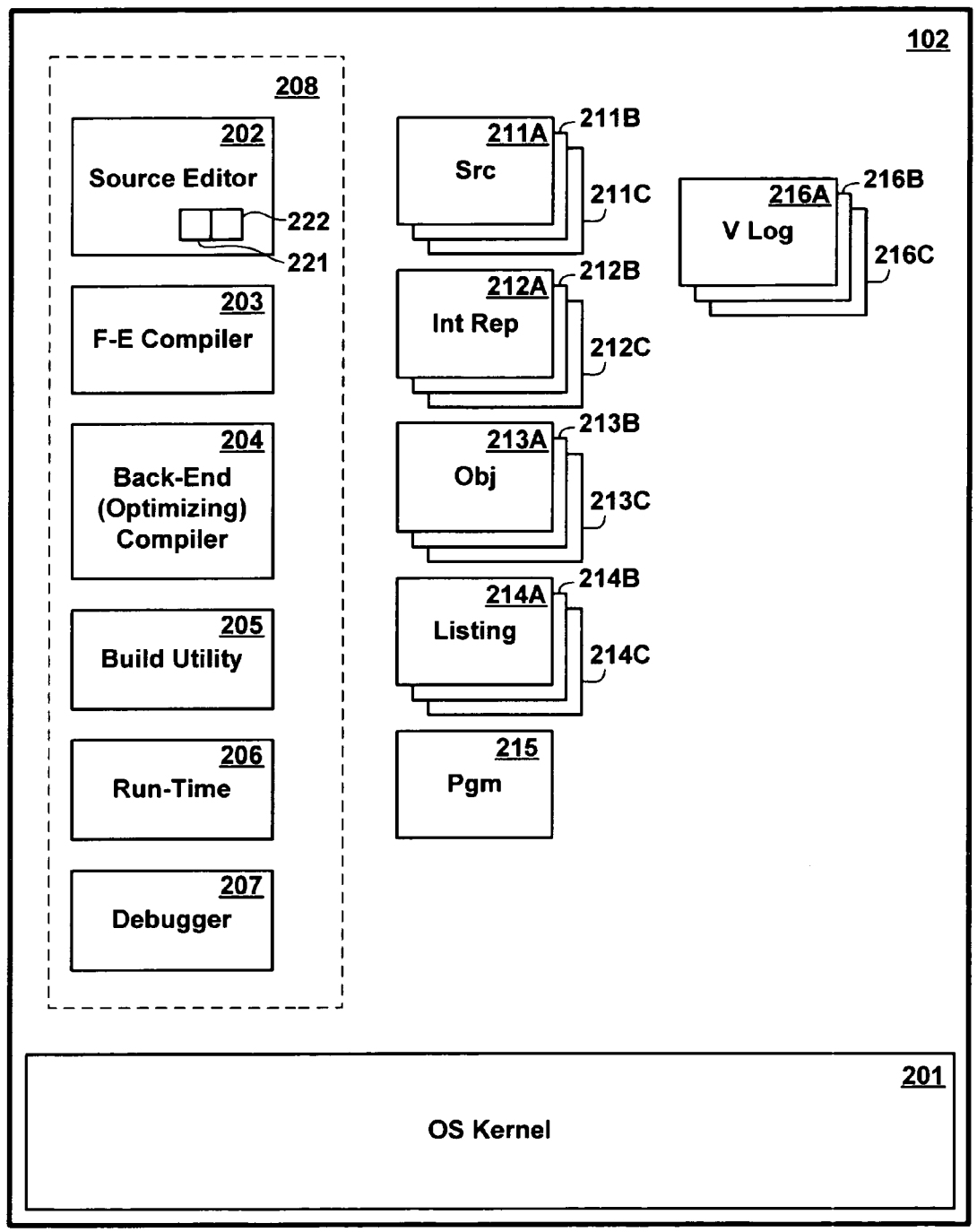
FIG. 2 is a conceptual illustration of the major software components of a computer system for developing computer programming code, according to the preferred embodiment.

FIG. 2 is a conceptual illustration of the major software components of system 100 in memory 102. Operating system kernel 201 provides various low-level software functions, such as device interfaces, management of memory pages, management and dispatching of multiple tasks, and so forth, as is well-known in the art. Various programs such as source editor 202, front-end compiler 203, back end (optimizing) compiler 204, build utility 205, run time utility 206, and debugger 207 form an integrated development environment 208 for producing executable computer programming code.

Source editor 202 is an executable computer program which supports the creation and editing of source code for other computer programs, using any of various known techniques. Source files 211A-211C (herein generically referred to as feature 211) are files containing source code which are created and edited using source editor 202. Source editor 202 may be a general-purpose free-form text editor for editing text files, which is non-specific to a programming language, or may a special-purpose source editor for one or more programming languages. In accordance with the preferred embodiment of the present invention, source editor 202 includes two state bits, designated Unverified_Copy_Warn_Enable 221 and Multi-Edit_Enable 222. These are preferably user-settable configuration bits, which are used to enable or disable certain editing features, as described in greater detail herein.

Front-end compiler 203 is an executable program which converts source files 211A-C to corresponding files in an intermediate representation 212A-212C (herein generically referred to as feature 212). Intermediate representations may take any of various forms, but typically they provide some form of commonality between different source or object forms. I.e., source code written in different forms may be compiled by different front-end compilers to a common intermediate form for further compilation by a common back-end compiler. Alternatively, source code may be compiled by a single front-end compiler to a common intermediate form for use on different hardware platforms, the common intermediate form being then compiled by different back-end compilers associated with different respective hardware.

Back-end compiler 204 is an executable computer program which compiles the intermediate representation files 212A-C into corresponding object code modules 213A-213C (herein generically referred to as feature 213) of executable statements. Typically, back-end compiler has the capability to perform certain code optimizations, although it need not necessarily be an optimizing compiler. Back-end compiler further has the capability to generate corresponding listing files 214A-214C (herein generically referred to as feature 214) as part of the compilation process. A listing 214 correlates instructions and variable locations in the executable object code with statements and variables in the intermediate representation 212 or source representation 202.

Build utility 205 is an executable computer program which builds a program 215 developed by development environment 208 by incorporating or binding multiple object code modules. Run-time support module 206 is low-level executable program code which provides necessary functions enabling a program built by build utility 205 to execute on system 100. Debugger 207 is an executable program which is used to assist the programmer in analyzing executable computer programming code for defects, typically by displaying source code and state information during execution of the program.

Although source editor 202, front-end compiler 203, back-end compiler 204, build utility 205, run-time support module 206, and debugger 207 are shown as separate entities in FIG. 2, it will be understood that these are often packaged together as part of an integrated application development environment. Furthermore, it will be appreciated that some or all of these functions, and in particular run-time support, are often incorporated into an operating system. Additionally, although functional modules 202-207 are depicted in FIG. 2 on a single computer system 100 for completeness of the representation, it is not necessarily true that all functions will be present on a single computer system or will be performed on a single computer system. For example, editing of source code may be performed by source editors located in a distributed manner in individual workstations, while compiling and building of code might be performed by a centralized server.

In accordance with the preferred embodiment, memory 102 further includes a set of verification log files 216A-216C (herein generically referred to as feature 216), one corresponding to each respective source file 211. The verification log file records the verification and derivation status of portions of the source code in the respective source file, preferably recording the status of individual lines or statements of source code. The verification log file is used to make source code editing more efficient by identifying unverified and copied portions of the code, as explained in further detail herein. The verification log file is automatically maintained by source editor 202 and front-end compiler 203, without manual intervention by the programmer. Although the verification file 216 is preferably a separate entity, the information contained therein could alternatively be integrated into the source file 211, or some other file or files.

Although a certain number of source modules, object modules, application programs and service programs are shown in the conceptual representation of FIG. 2, it will be understood that the actual number of such entities may vary, and in particular, that in a complex program development environment, the number of such entities is typically much larger. Furthermore, it will be understood that various entities could be stored in a distributed fashion on multiple computer systems.

While the software components of FIG. 2 are shown conceptually as residing in memory 102, it will be understood that in general the memory of a computer system will be too small to hold all programs and other data simultaneously, and that information is typically stored in data storage devices 125-127, comprising one or more mass storage devices such as rotating magnetic disk drives, and that the information is paged into memory by the operating system as required.

Figure 3:
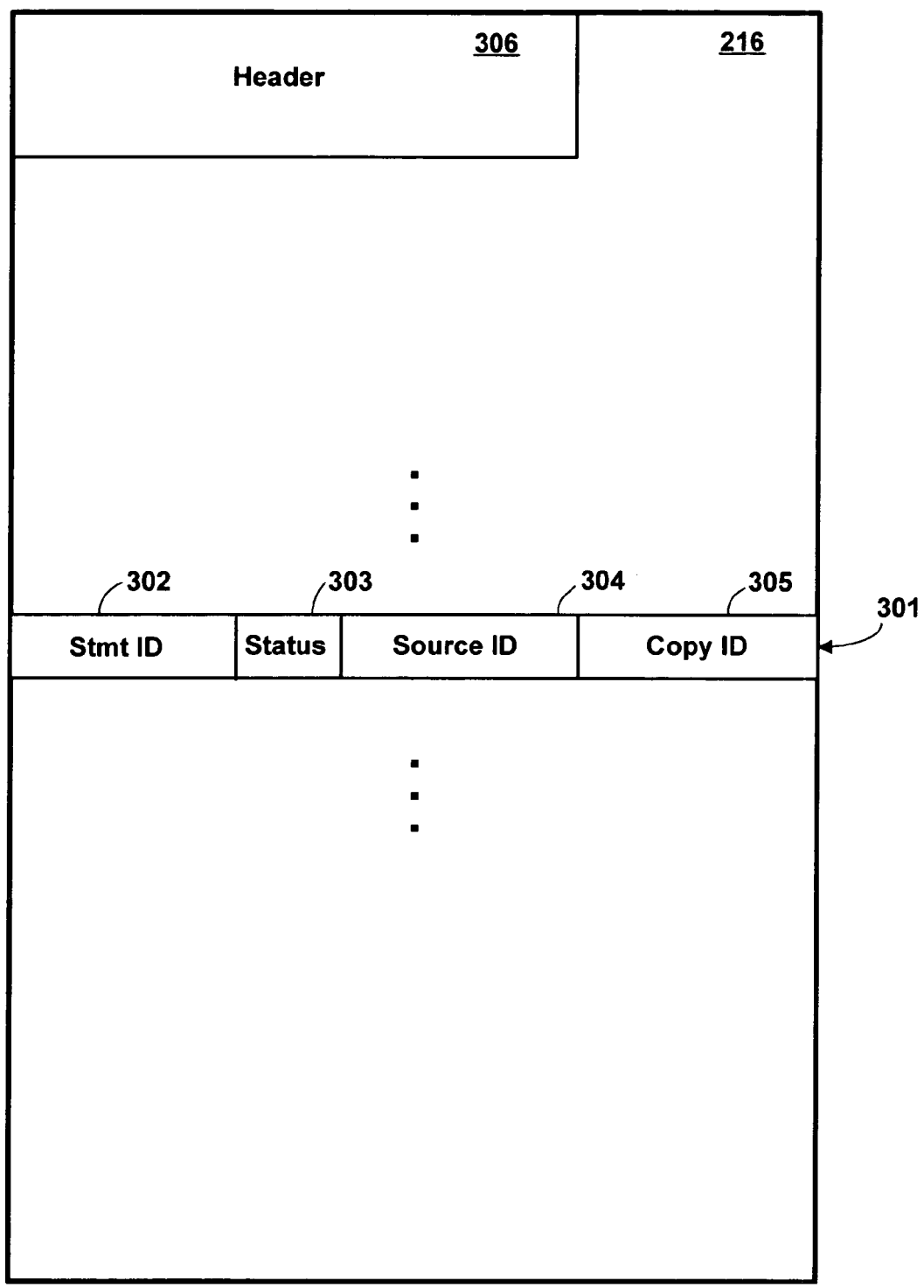
FIG. 3 is a representation showing in greater detail a generalized structure of a verification log, according to the preferred embodiment.

FIG. 3 is a representation showing in greater detail a generalized structure of a verification log 216, according to the preferred embodiment. As shown, verification log 216 includes a header 306, and a plurality of entries 301, each entry corresponding to a source code statement. Each entry includes a statement identifier 302, a status 303, an optional source statement identifier 304, and an optional copy operation identifier.

Header 306 contains file identifying information sufficient to identify it to the system as a verification file corresponding to a particular source file. Specifically, header 306 contains an identifier of the source file 211 to which it corresponds. Header 306 may contain additional useful information, such as a date of most recent verification or compilation, number of entries in the verification file, and so forth.

Statement identifier 302 identifies the statement in source file 211 to which the verification log entry 301 corresponds. Statement ID 302 may be in any form sufficient to uniquely identify a source code statement. For example, source code statements might be numbered, or might be identified by pointers or other means. Status field 303 indicates the verification status of the source code statement. The following status codes are defined:

Unverified: The statement has not been verified since last edited.
Copied: The statement has not been verified; moreover, it was copied from another unverified statement, or has itself been copied to another statement.
Copied/Verified: The statement has been copied from a previously verified statement, or is itself a previously verified statement which has been copied to another statement.
Copied/Modified: The statement has not been verified. It was copied from another statement, or has itself been copied, and modified subsequent to copying.

Source ID 304 is the statement identifier of a statement from which the subject statement was copied. If the status of the subject statement is "Unverified", there is no corresponding Source ID. Copy ID305 is an arbitrary identifier given to a copying operation, to distinguish it from other copying operations. In the preferred embodiment, Copy ID is a sequence number of the copy operation, such as a 16-bit integer. The sequence number necessarily wraps after being incremented past its limit. However, it is relatively unlikely that two different copy operations will have the same sequence number. As explained in further detail herein, the Copy ID is used to identify those code segments which were probably copied at the same time, and absolute certainty is not required. The Copy ID could alternatively be a timestamp, or some other distinguishing identifier.

It will be understood that FIG. 3 is intended to represent the significant components of verification log 216 used for assisting user source code editing, in accordance with the preferred embodiment. As in the case of any file, a verification log may include additional fields or structures for log maintenance, indexing of entries, and so forth, such as pointers or other data. In the preferred embodiment, the "verified" state is considered the default, so that any source statement which does not contain a corresponding log entry is considered "verified". However, it would alternatively be possible to consider other conditions the default or to include an entry for each verified statement.

In accordance with the preferred embodiment of the present invention, a verification log is maintained in an integrated development environment, so that it is possible to determine the verification state of individual source statements and whether the statements were copied from other statements. The verification log is used for two purposes in the preferred embodiment, although it might alternatively be used for other or additional purposes. Where the programmer creates multiple copies of a statement, a record of this fact can be used for later simultaneous editing of the multiple copies. Additionally, where the programmer attempts to copy and paste a statement that has not been verified, the programmer can be warned of that fact. The operation of these features within the integrated development environment is described in further detail below, and illustrated in FIGS. 4 and 5.

Figure 4:
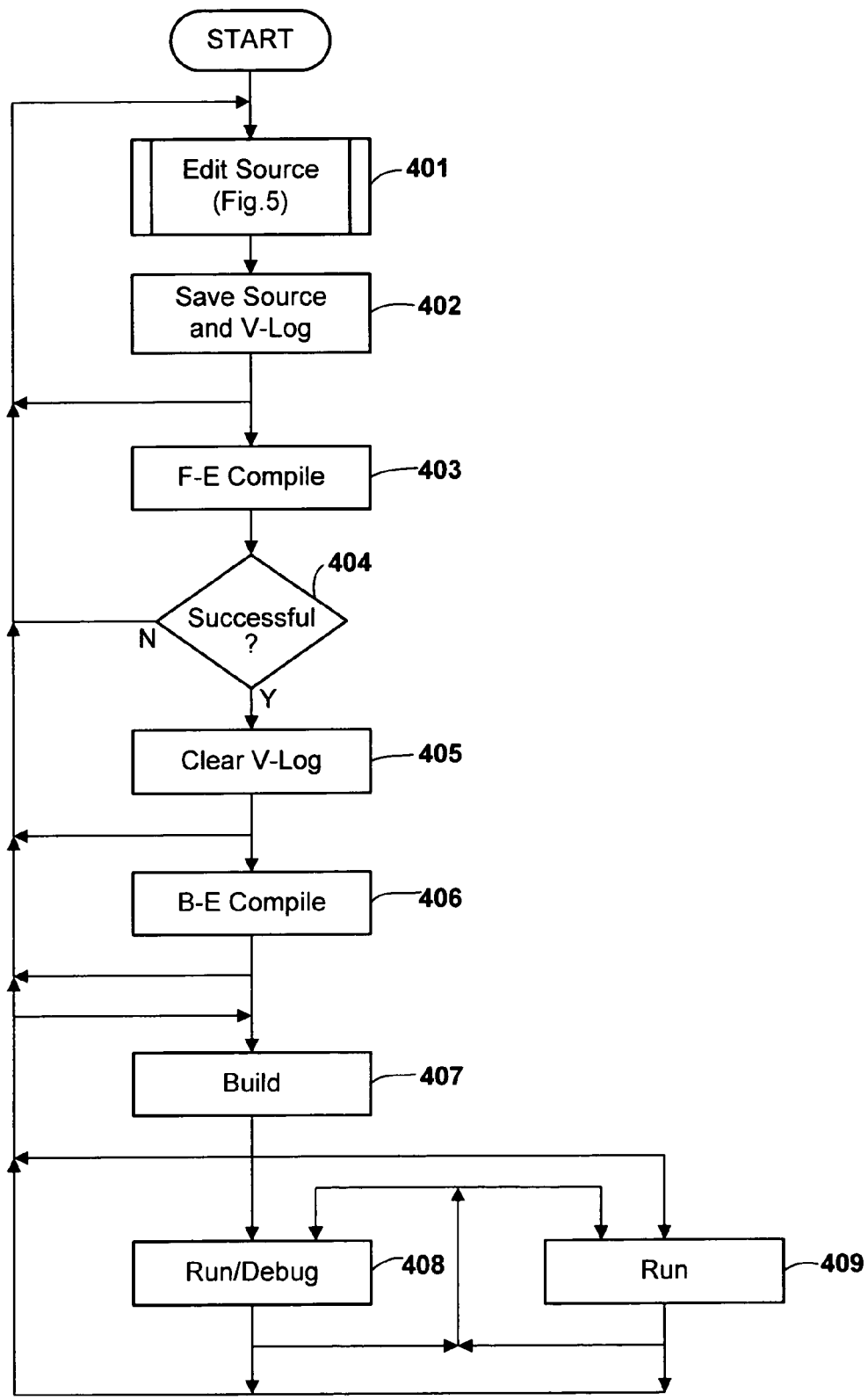
FIG. 4 is a high-level flow diagram showing the process of developing a computer program, according to the preferred embodiment.

FIG. 4 is a high-level flow diagram showing the process of developing a computer program 215 using integrated development environment 208. Referring to FIG. 4, a programmer edits a source file 211 using source editor 202. The source editing process is represented as block 401 in FIG. 4, and shown in greater detail in FIG. 5.

When finished editing, the edited source file 211 is saved (block 402). Saving the source file causes the editor 202 to automatically save the corresponding verification state of the source statements in a verification log 216 corresponding to the source file.

The programmer may then continue to edit the source file (as shown by the flow path returning to block 401), or may proceed to compile the source. Preferably, the source file 211 is processed by front-end compiler 203 to produce an intermediate code representation 212 (block 403). If processing by the front-end compiler is unsuccessful, i.e., one or more errors were detected in the source file by the front-end compiler, the 'N' branch is taken from block 404, and the programmer must return to block 401 to correct the errors. If the front-end compilation is successful, then, in addition to conventional compilation steps for producing an intermediate code representation, the front-end compiler clears verification log 216 (block 405). Because source code statements are considered "verified" by default, clearing the verification log indicates that all statements have been verified. The verification log is "cleared", meaning statement entries are removed, but the file and header remain as a record that a verification log exists for the corresponding source file.

Following successful completion of the front-end compile, the programmer may return to block 401 to perform further editing operations, or may continue to back-end compilation (block 406). Back-end compilation produces object code 213 and compilation listing 214. Back-end compilation is performed in accordance with any conventional compilation techniques, which may or may not include any of various code optimizations.

In the preferred embodiment, code compilation is performed in a two-phase (front-end and back-end) process which produces an intermediate representation. Typically, when such a process is used, the front-end compiler performs most or all of the syntax and other code verifications performed by the compiler. If the front-end compilation process completes without error and generates intermediate code, the source code which was input to the front-end compiler can be regarded as essentially verified. For this reason, the verification log is preferably cleared at block 405, after successful front-end compilation and before back-end compilation. It will be understood that "verification" is never complete in an absolute sense, and sometimes subtle code logic errors are not discovered until code has been shipped to customers and in use for some time. One could alternatively delay clearing of the verification log until completion of some other stage, such as completion of back-end compilation or completion of the testing phase. Furthermore, it will be understood that in some development environments, compilation is an indivisible process and no intermediate representation is produced.

Following the back-end compilation, the programmer may again return to block 401 to perform further editing operations, or may continue to build a program 215 from multiple object modules 213 using build utility 205 (block 407). After the build process, the programmer may again return to block 401 to edit the source, or may perform another build (e.g., because one of the other included object modules has changed), or may execute the program, either by running in a debug mode (block 408) or running normally without a debugger enabled (block 409). Testing after build will normally involve running a series of test cases and verifying the results observed, although it may also involve running in debug mode. Any of these processes may be repeated indefinitely (as indicated), or may cause the programmer to return to block 401 to again edit the source.

Figure 5:
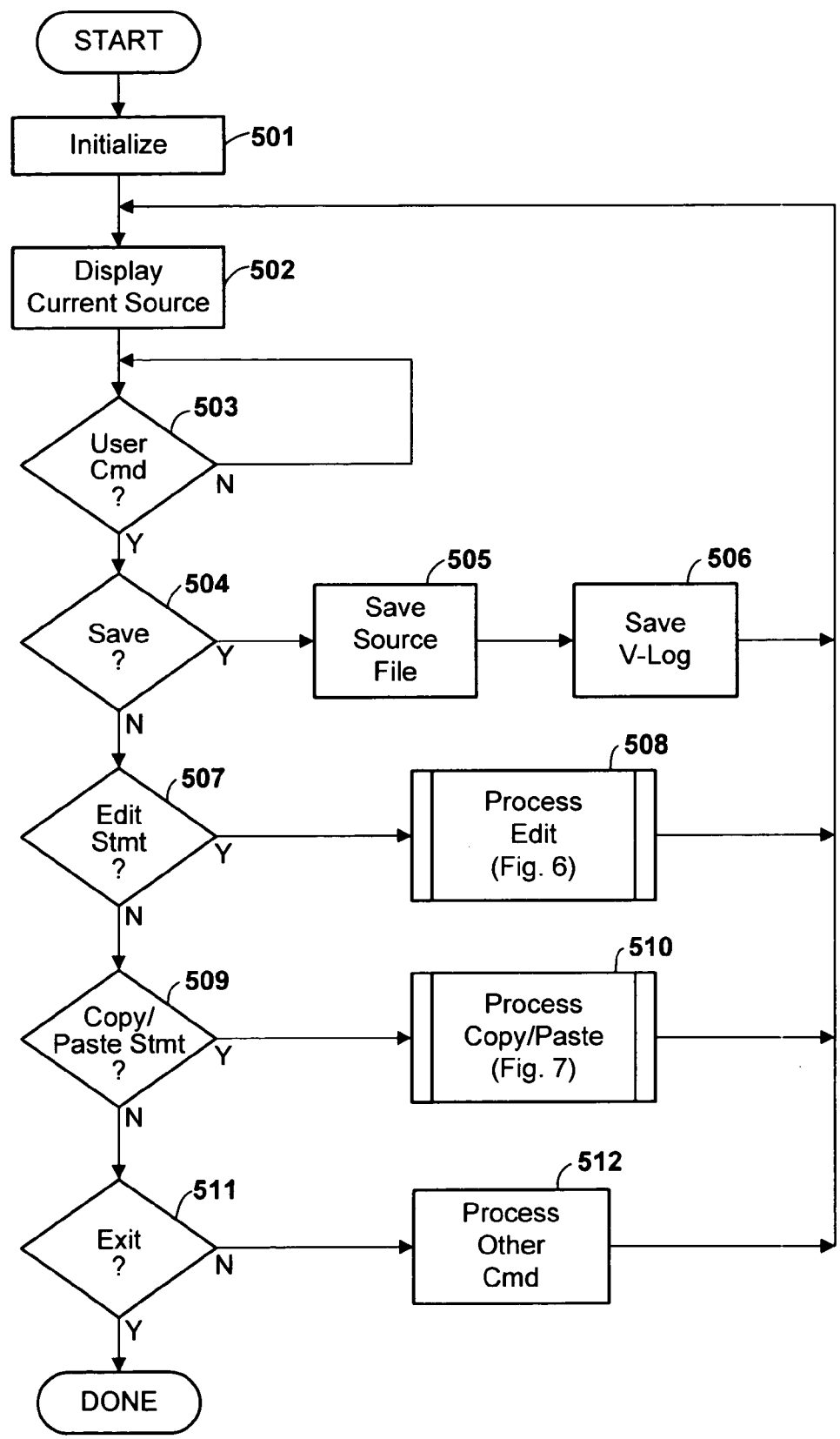
FIG. 5 is a high-level flow diagram showing the process of editing source code, according to the preferred embodiment.

FIG. 5 is a high-level flow diagram showing the process of editing source code 211 with source editor 202, represented at a greater level of generality in FIG. 4 as block 401. Source editor 202 is preferably an interactive screen editor in which the source is displayed on a display screen of an interactive computer terminal, and the programmer moves a cursor and edits the source directly on the screen display. Referring to FIG. 5, when an editing session is begun, the source editor performs certain state initializations, including loading the source file, as is known in the art (block 501). In addition to conventional state initialization, the source editor accesses the verification log 216 corresponding to the source file being edited, and initializes a respective verification state in memory for each source code statement according to the contents of the verification log. This verification state may be maintained in any appropriate form.

The source editor then displays the current source, which is typically only a portion of the source at the current location of the cursor (block 502). The source editor then waits for an interactive command from the user (programmer) at block 503. When a command is received, the 'Y' branch is taken from block 503.

If the command is a save command (the 'Y' branch from block 504), the source file being edited by the editor is saved in a persistent form, typically by writing to a non-volatile storage medium (block 505). At the same time, the current verification state of the source statements in the source file is saved to the corresponding verification log (block 506).

If the command is an edit statement command (the 'Y' branch from block 507), the edit command is processed appropriately. In an interactive editor, the user typically positions the cursor on the statement being edited, and enters one or more insertion, replacement, or deletion characters. Each individual character could be regarded as an edit command, but in the preferred embodiment the individual keystrokes are buffered, and the "edit command" is not complete until the user has indicated that the statement is completely edited, as by moving the cursor to another line, pressing an enter key, or some similar input. The processing of an edit command in accordance with the preferred embodiment is represented in FIG. 5 as block 508, and is shown in greater detail in FIG. 6.

If the command is a copy/paste command (the 'Y' branch from block 509), the copy/paste command is processed appropriately. The processing of a copy/paste command in accordance with the preferred embodiment is represented in FIG. 5 as block 510, and is shown in greater detail in FIG. 7.

If the command is none of the above mentioned commands, and is not an exit command, the 'N' branch is taken from block 511, and the command is processed as appropriate (block 512). If the command is an exit command, the 'Y' branch is taken from block 511 and the editing session terminates.

Figure 6:
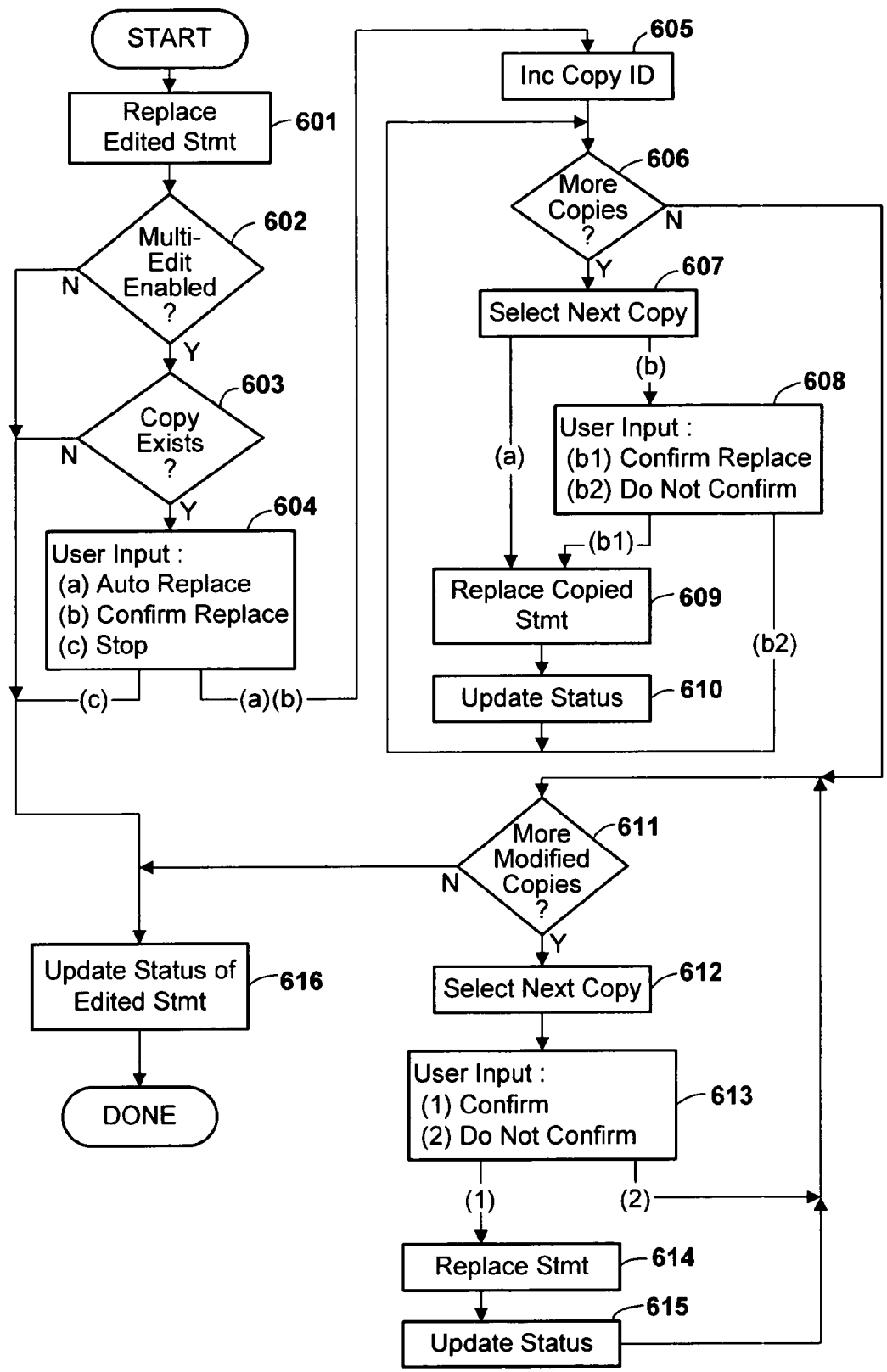
FIG. 6 is a flow diagram showing in greater detail the processing of an edit command by the source editor, according to the preferred embodiment.

FIG. 6 shows in greater detail the processing of an edit command by the source editor. When the programmer indicates he has finished editing a source statement, the source statement is replaced with its newly edited form (block 601). The editor then checks the state of Multi-Edit_Enable bit 222. If the bit is not set, the 'N' branch is taken from block 602, and the status of the edited statement is updated (block 616) as described further herein. If multi-editing is enabled, the editor determines whether any copies of the edited statement may exist (block 603). A copy may exist if the status of the edited statement is "Copied", "Copied/Verified" or "Copied/Modified". If no copies exist, the 'N' branch is taken from block 603 to block 616.

If multi-edit is enabled and there is at least one copy, the user is given a message to that effect and prompted for instructions, represented as block 604. The user may direct the editor to either (a) automatically replace all copies of the edited statement; (b) individually display and confirm replacement of each copy; or (c) perform no editing on the copies. If option (c) is chosen, the editor proceed to block 616. Otherwise, the editor proceeds to block 605 to increment the copy ID. The incremented copy ID will be the copy ID assigned to any copies made from the newly edited statement.

The editor then scans the status of the various source statements to find an exact copy of the edited statement. An exact copy is a statement having the same status, source ID and copy ID, where the status is either Copied or Copied/Verified. If an exact copy is found, the 'Y' branch is taken from block 606, and the copy found is selected (block 607). If, at block 604, the user had elected to confirm replacement of statements, the selected statement is displayed with the alterations made to the newly edited statement copied to the selected statement, and the user requested to confirm the copied alterations (block 608). If the user confirms the alterations, the selected statement is replaced with a copy of the newly edited statement (block 609), and the status of the selected statement is updated (block 610). The new status is in all cases "Copied", the source ID is the identifier of the newly edited statement, and a new copy ID equal to the incremented value set at block 605 is assigned. The editor then returns to block 606 to look for another copy of the newly edited statement. If, at block 608, the user does not confirm the alteration, blocks 609 and 610 are by-passed. If, at block 604, the user selected automatic replacement, then block 608 is by-passed, and the editor proceeds directly to blocks 609 and 610 from block 607.

When all exact copies have been found, the 'N' branch is taken from block 606 to block 611. The editor will then search for modified copies. A modified copy is a statement having the same source ID as the newly edited statement, but having a different copy ID, or having a status of "Copy/Modified", or in which the newly edited statement has a status of "Copy/Modified". In any of these cases, the modified copy was at one time based on the same statement as the newly edited statement, but is no longer identical to it. If a modified copy is found, the 'Y' branch is taken from block 611, and the next modified copy is selected (block 612).

The action to be taken on finding a modified copy may vary. In one implementation, the modified copy is displayed to the user and the changes made to the newly edited statement are pasted into the modified copy. The user is then asked to confirm the changes (block 613). If the user confirms the changes, the modified copy is replaced with the changes (block 614), and the status of the modified copy is updated (block 615). The status remains "Copied/Modified", but the source ID is now the identifier of the newly edited statement, and the copy ID is the incremented value set at block 605. The editor then returns to block 611 to look for another modified copy. It will be recognized, however, that in the case of modified copies, the pasting of changes by the source editor will frequently be wrong, and therefore as an alternative, the source editor might simply display the modified copy and allow the user to make his own changes manually.

When all modified copies have been processed, the 'N' branch is taken from block 611 to block 616.

At block 616, the status of the newly edited statement is updated, as follows. If the existing status is either "Verified" or "Unverified" (indicating no copies), the new status is "Unverified". If the existing status is either "Copied", "Copied/Verified", or "Copied/Modified" and the changes were not copied into any other source statement, then the new status is "Copied/Modified", and the source ID and copy ID remain the same. If the existing status is either "Copied", "Copied/Verified" or "Copied/Modified" and the changes were copied into at least one other source statement, then the new status is "Copied", the source ID is the identifier of the newly edited statement itself, and the copy ID is the value set at block 605.

Figure 7:
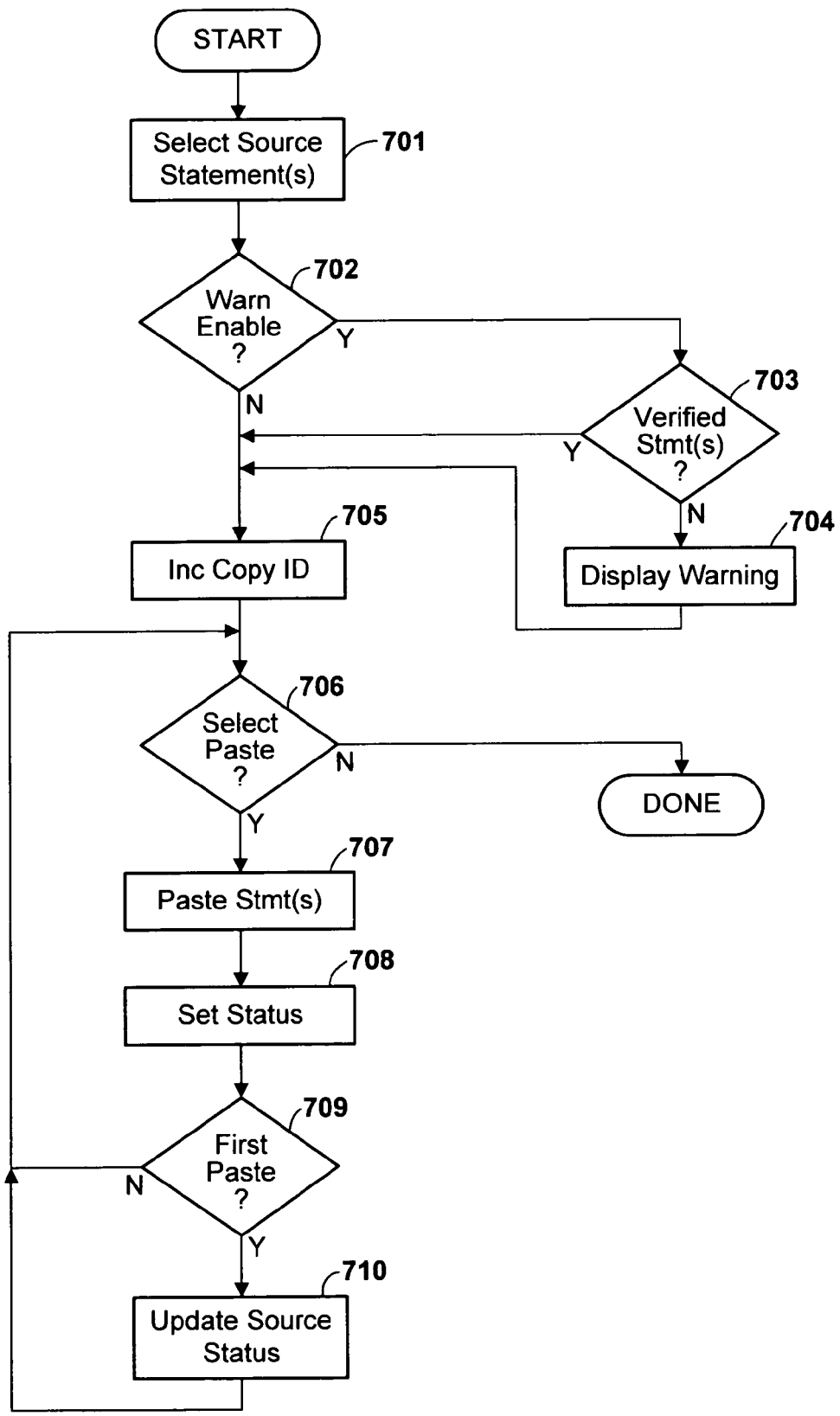
FIG. 7 is a flow diagram showing in greater detail the processing of a copy/paste command by the source editor.

FIG. 7 shows in greater detail the processing of a copy/paste command by the source editor. The user interactively selects one or more source statements to be copied (block 701). If the Unverified_Copy_Warn_Enable bit 221 is set, the 'Y' branch is taken from block 703. In this case, the source editor checks the verification status of all copied statements. If all statements are either "Verified" or "Copy/Verified", the 'Y' branch is taken from block 703. Otherwise, the 'N' branch is taken, and the source editor displays a suitable warning message to the user, to the effect that the user is attempting to copy source statements which have not been verified (block 704). The source editor then increments the copy ID; this incremented value will be used to identify multiple copies created in the same copy operation.

The source editor then waits for a paste command from the user, identifying a location for pasting the copied source statements. When a paste command is received, the 'Y' branch is taken from block 706. The statements are then pasted into the source file at the location indicated by the user (block 707). The status of the pasted statements are set appropriately (block 708). If the source statements which were copied were in a "Verified" state, then the pasted statements assume a state of "Copied/Verified"; otherwise, the status of the pasted statements is "Copied". If, however, only a portion of a source statement was copied and pasted, then that pasted portion has a status of "Copied/Modified", since it is not an exact copy. In all cases, the source ID of the pasted statement is the identifier of the corresponding source statement which was copied, and the copy ID is the value set at block 705.

If this is the first paste (the 'Y' branch from block 709), then the status of the source statements which were copied is also updated (block 710). The status of these statements is either "Copied" (for previously unverified statements) or "Copied/Verified" (for previously verified statements). The source ID is the identifier of the statement itself, and the copy ID is the value set in block 705.

The editor then returns to step 706, and the programmer may elect to paste the same source statements in one or more additional locations. When finished pasting, the 'N' branch is taken from step 706.

As is well known in the use of interactive editors, Copy/Paste actually two separate operations, and the user may optionally perform additional and unrelated operations after selecting statements to be copied (blocks 701-705) and before pasting the selected statements (blocks 706-710), or between pasting operations. These additional operations are omitted from FIG. 7 for clarity of illustration.

In general, the routines executed to implement the illustrated embodiments of the invention, whether implemented as part of an operating system or a specific application, program, object, module or sequence of instructions, are referred to herein as "programs" or "computer programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, magnetic tape, and transmission-type media such as digital and analog communications links, including wireless communications links. An example of signal-bearing media is illustrated in FIG. 1 as system memory 102, and as data storage devices 125-127.

In the preferred embodiment, a verification log is maintained with respect to source statements intended for compilation as executable computer code. However, it will be recognized that the present invention could alternatively be used for other forms of source files, which are not necessarily compiled into executable computer programs. For example, the present invention could be used for editing HTML statements in an HTML file intended to be rendered into a displayable web page.

Although a specific embodiment of the invention has been disclosed along with certain alternatives, it will be recognized by those skilled in the art that additional variations in form and detail may be made within the scope of the following claims:

What is claimed is:

1. A method for developing source code for a computer program, comprising the steps of:
    generating a plurality of source code statements in a source code file, said source code file being compilable into object code of said computer program;
    automatically maintaining a record of status of each respective source code statement, said record of status including, with respect to each of one or more said source code statements, whether the respective source code statement has been generated as a copy of a source code statement other than the respective source code statement;
    editing a first source code statement of said plurality of source code statements to produce an edited first source code statement;
    automatically determining whether one or more copies of said first source code statement exist within said source code file based on said status of each respective source code statement, each of said first source code statement and copy of said first source code statement occupying a different respective location within said source code file and being compilable together into said object code of said computer program; and
    responsive to said automatically determining step, automatically propagating changes made by said editing step to said one or more copies of said first source code statement.

2. The method for developing source code for a computer program of claim 1, wherein said automatically propagating step comprises:
    automatically displaying said changes made by said editing step to at least one said copy of said first source code statement; and
    soliciting user confirmation of said changes.

3. The method for developing source code for a computer program of claim 1, wherein said status of each respective source code statement comprises data indicating whether the respective source code statement has been verified.

4. The method for developing source code for a computer program of claim 3, wherein said data indicating whether a respective source code statement has been verified indicates whether the respective statement has been verified as part of a compilation process for compiling source code into object code executable by a computer system.

5. The method for developing source code for a computer program of claim 1, further comprising the steps of:
    receiving a user command to copy a second of said plurality of source code statements to a different location within said source code file;
    responsive to receiving said user command, automatically determining whether said second source code statement has been previously verified from said status of each respective source code statement; and
    if said second source code statement has not been previously verified, automatically warning a user that said second source code statement is unverified.

6. A method for developing source code for a computer program, comprising the steps of:
    generating a plurality of source code statements in a source code file, said source code file being compilable into object code of said computer program;
    automatically maintaining a record of status of each respective source code statement said record of status including, with respect to each of one or more said source code statements, whether the respective source code statement has previously been verified by an automated verification process as conforming to a pre-defined set of source code requirements;
    receiving a user command to copy a first of said plurality of source code statements to a different location within said source code file to create a second source statement at said different location, said second source code statement being identical to said first source code statement, each of said first source code statement and said second source code statement being compilable together into said object code of said computer program;
    responsive to receiving said user command, automatically determining whether said first source code statement has been previously verified based on said status of each respective source code statement; and
    if said first source code statement has not been previously verified, automatically performing at least one action in response to determining that said first source code statement is unverified.

7. The method for developing source code for a computer program of claim 6, wherein said step of automatically performing at least one action in response to determining that said first source code statement is unverified comprises issuing a warning message to a user.

8. The method for developing source code for a computer program of claim 6, wherein said step of automatically determining whether said first source code statement has been previously verified comprises automatically determining whether said first source code statement has successfully completed some portion of a compilation process for compiling source code into object code executable by a computer system.

9. The method for developing source code for a computer program of claim 6, wherein said status of each respective source code statement comprises data indicating whether the respective statement was copied from another source code statement.

10. The method for developing source code for a computer program of claim 9, wherein said step of automatically determining whether said first source code statement has been verified comprises automatically determining whether said first source code statement was copied from another statement which has been previously verified.

* * * * *